United States Patent [19]

Sawano et al.

[11] Patent Number: 5,531,064
[45] Date of Patent: Jul. 2, 1996

[54] OPTICAL FIBER CABLE CONTAINING RIBBON FIBERS

[75] Inventors: Hiroyuki Sawano; Masayoshi Yamanaka; Yutaka Kurosawa; Matsuhiro Miyamoto, all of Chiba-ken, Japan

[73] Assignee: Fujikura Ltd., Tokyo, Japan

[21] Appl. No.: 400,091

[22] Filed: Mar. 7, 1995

[30] Foreign Application Priority Data

Jun. 3, 1994 [JP] Japan .................................. 6-144058

[51] Int. Cl.⁶ .............................. D01H 13/26; G02B 6/44
[52] U.S. Cl. .............................. 57/204; 57/293; 385/112; 385/113; 385/114
[58] Field of Search ............................ 385/109–11, 112, 385/113, 114; 57/204, 293, 218, 294

[56] References Cited

U.S. PATENT DOCUMENTS

| | | | |
|---|---|---|---|
| 4,697,875 | 10/1987 | Priaroggia | 350/96.23 |
| 4,722,589 | 2/1988 | Priaroggia | 350/96.23 |
| 4,725,121 | 2/1988 | Priaroggia | 350/96.23 |
| 4,906,067 | 3/1990 | Mayr et al. | 385/112 |
| 5,212,756 | 5/1993 | Eoll | 385/114 |
| 5,229,851 | 7/1993 | Rahman | 385/112 |
| 5,233,678 | 8/1993 | Katurachima et al. | 385/112 |
| 5,249,249 | 9/1993 | Eoll et al. | 385/110 |
| 5,390,273 | 2/1995 | Rahman et al. | 385/112 |
| 5,408,562 | 4/1995 | Yoshizawa et al. | 385/110 |

FOREIGN PATENT DOCUMENTS 65006  3/1987  Japan .................................. 385/113

OTHER PUBLICATIONS

"A Study on Reverse Lay Stranding Loose Tube Cable Containing Ribbon Fibers", M. Yamanaka et al., Proceedings of 42nd International Wire and Cable Symposium, pp. 521–526 (1993).

*Primary Examiner*—Daniel P. Stodola
*Assistant Examiner*—William Stryjewski
*Attorney, Agent, or Firm*—Finnegan, Henderson, Farabow, Garrett & Dunner

[57] ABSTRACT

A loose tube optical fiber cable with SZ stranding in which the units receive two or more laminated multicase ribbons stranded toward a central member with the stranding direction reversed at specific intervals. These multicase ribbons are twisted in the same direction as the stranding of the tube units, and a reverse stranding angle of the tube units is selected to be a value within a specific scope.

2 Claims, 3 Drawing Sheets

OPTICAL FIBER CABLE CONTAINING RIBBON FIBERS

BACKGROUND OF THE INVENTION

1. Field of the Invention

The present invention relates to an optical fiber cable which strands a plurality of tube units receiving multicore ribbons in S-Z shaped configuration, and in particular to an optical fiber cable capable of making transmission loss accompanied by bending of the optical fiber cable as small as possible.

2. Description of the Prior Art

Lately, servicing of a subscriber's communication network, or local network has been progressed and there is a demand for cables with a large number of fibers, hence users seek cables of binding a practicable plurality of multicore ribbons into a piece of cable. Especially, there is a strong demand of high-count optical fiber cables to construct Fiber-to-the-Home (FTTH) lines. Therefore, there are in general use two categories of cables, that is a so-called loose tube type cable and a so-called slotted rod type cable. In the loose tube type cable, a multicore ribbon, or parallel fibers, is received into a tube as an optical optical fiber cable and a plurality of tube units are stranded toward a central member and they are wound suitably under the pressure. In the slotted rod type cable, a plurality of multicore ribbons are received in slotted rods provided on the circumference of a central member.

The local loop in telecommunication network is required to have a post-branch function at the ends of such a cable, in addition to a low price feature and multicore package connectivity. The post-branch function means such a branch connection function that a plurality of multicore ribbons received into one tube in a trunk line are fetched outside the tube to carry out branch wiring to each home. Ease of mid-span access is considered to be a key of local cable in FTTH applications.

Such tubes containing the optical fibers or the optical fibers themselves are often wound helically around a central supporting structure which can contain the tensile member. In some cases, they are placed on the central supporting structure in what is called an S or Z shaped configuration, or in other words, they are wound around the central supporting structure in a first direction, or hand, for one or several turns and then, the direction of winding is reversed for one or several turns. Such reversal is continued periodically. See, for example, U.S. Pat. Nos. 4,697,875; 4,722, 589; 4,725, 121; and 5,229,851.

As one of the most excellent tubes for the above-mentioned branch connection function in the loose tube type cables, we could choose a loose tube type cable with that S or Z shaped configuration (hereinafter, referred to as "a conventional loose tube cable with SZ stranding"). Such SZ stranding of the tubes 61 through 66 is illustrated in FIG. 1. Thus, the tubes 61 through 66 are helically wound in a first direction, or hand, around the covering 71 for one or several turns and then, are helically wound in the opposite direction, or hand, around the covering 71 for one or several turns, such alternate direction of winding being continued periodically or aperiodically.

The above-mentioned conventional loose tube cable with SZ stranding is structured such that the tube units are stranded in a specific pitch toward the central member in the S and Z directions, and in order to resolve a difference between an expansion strain in the extension side and a contraction strain in the compression side of the tube units caused when the tube units are bent, a reverse stranding angle $\phi$ is equalized to $(240°-310°)+360°n$ (where n is zero or any positive integer). By calculating the above-mentioned difference in the expansion strain and contraction strain, it is possible to make a transmission loss of the optical fiber due to bending of the loose tube cable with SZ stranding as small as possible.

When the conventional loose tube cable with SZ stranding is bent by rolling it around a drum or the like, movements of the multilayered multicore ribbons with respect to the tube are prevented in the reverse stranding portion. Therefore, a force acts on the optical fiber in the reverse stranding portion to increase a transmission loss, and also a compression force acts on the multicore ribbon inside (in the compression side of) a neutral line of tubes at intervals of the reverse stranding portion and a tensile force acts on the multicore ribbon outside (in the tension side of) a neutral line of tubes at such intervals, whereby the inside multicore ribbon is strongly pressed against an inner surface of tubes at intervals of the reverse stranding portion and then a force acts on the optical fiber to increase a transmission loss. It is a very material problem if a force applied to the multicore ribbon be relaxed according to movements of the multicore ribbon within these tubes, to the effect that the transmission loss of the conventional loose tube cable with SZ stranding is made as small as possible.

In order to overcome this problem, there has already been the well-known following technique. That is, on the assumption that, in the optical fiber cable, the tube units receiving the multicore ribbon are stranded toward a central member and that its stranding direction is reversed at constant intervals, the multicore ribbon is twisted unidirectionally and its twisting pitch is 1/n or less of a stranding pitch of the tube units (where n is 1 or more). Refer to M. Yamanaka et al., Proceeding of 42nd International Wire and Cable Symposium, pp521–526. According to the Yamanaka's technique, as the multicore ribbon received in the tube is twisted once or more at intervals of the portion that the stranding of the tube units is reversed, in such a condition that the tube units are bent, a neutral line N of the tube units as shown in FIG. 2 forms the boundary between its tension side Tx and its compression side Cx and each of the multicore ribbons is positioned alternately therebetween and a length of each of the multicore ribbons positioned in the tension side Tx is substantially equal to that of each thereof positioned in the compression side Cx. Accordingly, an expansion strain and a contraction strain of the multicore ribbons accompanied by bending of the tube units are cancelled by each other at intervals at one pitch of the stranding of the tube units. Therefore, a force of moving the multicore ribbon toward the tube does not act on the reverse stranding portion of the tube unit, and also a force of strongly pressing the multicore ribbon against an inner surface of the tube does not act at intervals of the reversed portion of the tube units. However, since it has not previously been known how far the reverse stranding angle $\phi$ of the tube unit is, effects of the reduction of the transmission loss were insufficient.

Furthermore, in the conventional loose tube cable with SZ stranding, there were some problems caused by a difference in thermal expansion between the multicore ribbon and the tube accompanied by a temperature change. As extension of the multicore ribbon is relatively small as compared with extension of the tube due to a temperature change and tension is not applied to the multicore ribbon when the tube extends, the multicore ribbon is received with a slight margin in the longitudinal direction. Accordingly, when the tube extends, a looseness within the tube of the multicore ribbon is increased, and therefore the multicore ribbon bends largely within the tube and is brought into pressure contact with an inner wall of the tube to receive a force, so that a loss increase is incremented. Such problem occurs.

SUMMARY OF THE INVENTION

Accordingly, it is an object of the present invention to relax extension and compression strain of multicore ribbons caused by bending of tube units in the above-mentioned conventional loose tube cable with SZ stranding, whereby it is possible to reduce a transmission loss of an optical fiber cable.

In further detail, it is another object of the present invention to optimize a reverse stranding angle φ of the tube units of the loose tube cable with SZ stranding, whereby it is possible to reduce the transmission loss of the optical fiber cable.

In further detail, it is still another object of the present invention to resolve a problem caused by a difference in thermal expansion between the multicore ribbons and the tubes accompanied by a temperature change in the loose tube cable with SZ stranding, whereby it is possible to reduce the transmission loss of the optical fiber cable.

In order to achieve the above-mentioned objects, with the feature of the present invention, in the loose tube cable with SZ stranding in which the tube units receiving the multicore ribbons are stranded toward a central member and its stranding direction is reversed at specific intervals, the multicore ribbons are twisted in a same direction at the same pitch as stranding of the tube units, and a reverse stranding angle of the tube units is equalized to $(215°$ to $335°)+ n \cdot 360°$ (where n is zero or any integer of 1 or more). With such constitution as the multicore ribbon received within the tube is twisted in the same direction at the same pitch as stranding of the tube units at intervals of a reversed stranding portion of the tube unit, in such a condition that the tube unit is bent, a neutral line of the tube unit forms the boundary between its tension and compression sides and each of the multicore ribbons is positioned alternately in the tension and compression sides, and a length of each of the multicore ribbons positioned in the tension side is equal to that of each thereof positioned in the compression side. Accordingly, an extension strain and a compression strain of the multicore ribbons accompanied by bending of the tube units are cancelled by each other at intervals at one pitch of the stranding of the tube units. Therefore, a force of moving the multicore ribbon toward the tube does not act on the reverse stranding portion of the tube unit, and also a force of strongly pressing the multicore ribbon against an inner surface of the tube does not act at intervals of the reverse portion of the tube unit.

Accordingly, the above-mentioned problem produced by movements of the multicore ribbon within the tube due to bending of the tube unit is resolved.

Furthermore, the reverse stranding angle of the tube unit is made at $(215°$ to $335°)+n \cdot 360°$ (where n is any integer of 1 or more), whereby, in corporation with reduction effects of a transmission loss due to the same reason as the above-mentioned conventional loose tube cable with SZ stranding, the transmission loss can be reduced still more.

Furthermore, in the optical fiber cable according to the present invention, as shown in FIG. 6, the relationship among a clearance C of the multicore ribbon and tube; a width 2 W(mm) of a multicore ribbon 2; a thickness T(mm) of a multicore ribbon unit 3; and an inside diameter 2 di(mm) of a tube is formulated in the following equation:

$$C = 2 \cdot \sqrt{di^2 - W^2} - T > 1.2 \qquad (1)$$

Therefore, the optical fiber cable according to the present invention resolves the problem caused by a difference in thermal expansion between the multicore ribbon and the tube due to a temperature change, and the transmission loss can be reduced.

Other and further objects and features of the present invention will become obvious upon an understanding of the illustrative embodiments about to be described in connection with the accompanying drawings or will be indicated in the appended claims, and various advantages not referred to herein will occur to those skilled in the art upon employing the invention in practice.

DETAILED DESCRIPTION OF THE EMBODIMENTS

Figure 1:
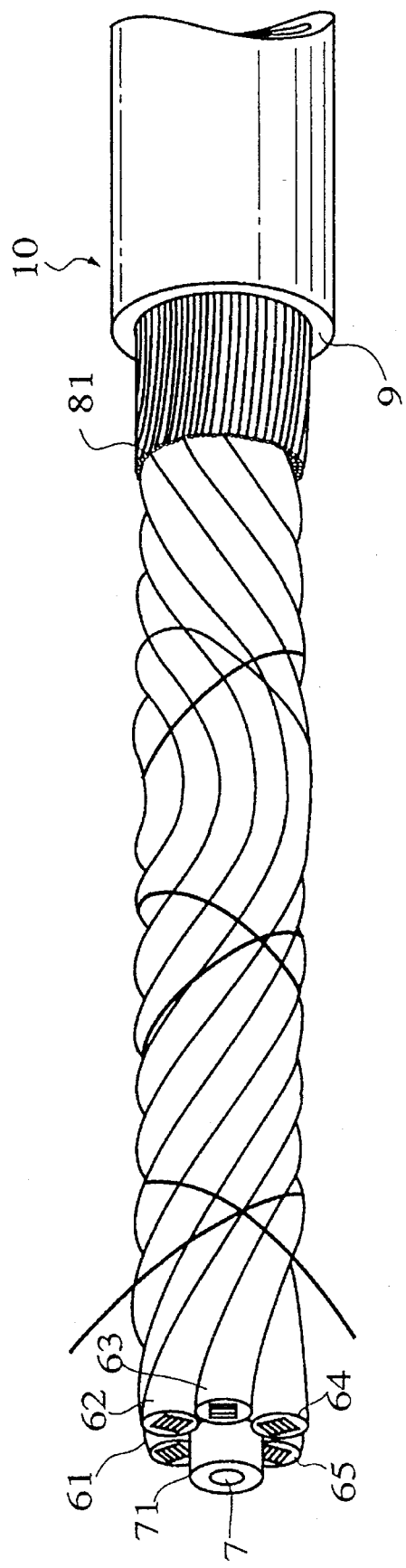
FIG. 1 is a typical bird's-eye view of a conventional loose tube cable with SZ stranding.
Figure 2:
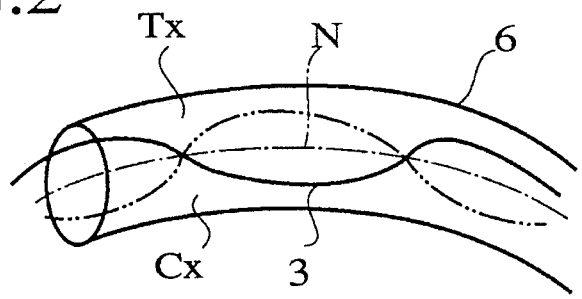
FIG. 2 is a view showing the relationship between an extension strain and a compression strain accompanied by bending of a tube unit.

The embodiment of the present invention will be described with reference to the accompanying drawings. It is to be noted that the same or similar reference numerals are applied to the same or similar parts and elements throughout the drawings, and the description of the same or similar parts and elements will be omitted or simplified.

Figure 3:
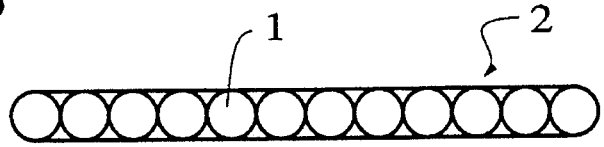
FIG. 3 is a cross-sectional view showing a multicore ribbon according to a preferred embodiment of the present invention.
Figure 4:
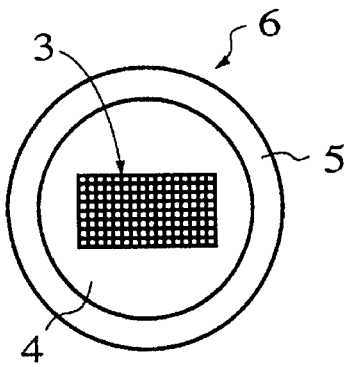
FIG. 4 is a cross-sectional view showing a tube unit according to the preferred embodiment of the present invention.
Figure 5:
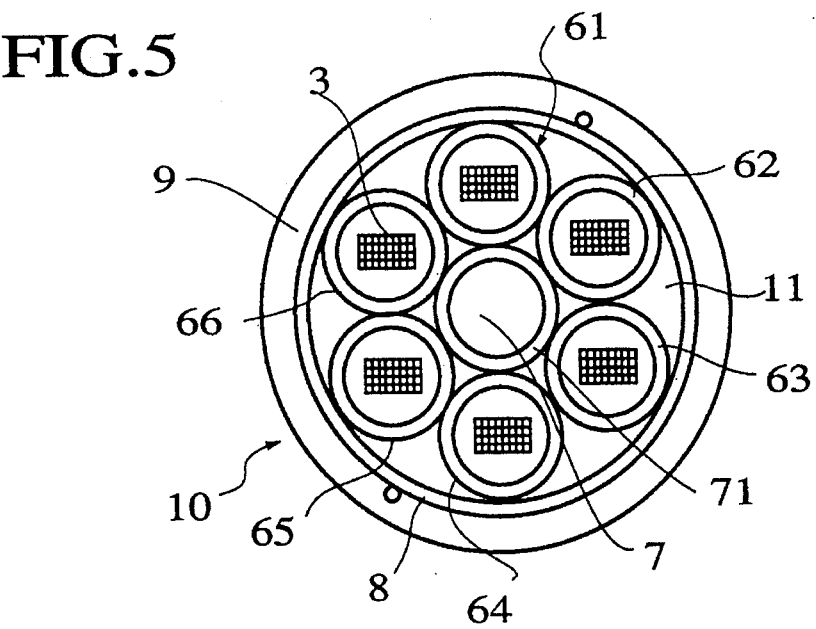
FIG. 5 is a cross-sectional view showing a loose tube unit with SZ stranding according to the preferred embodiment of the present invention.

FIG. 1 is a cross-sectional view showing a multicore ribbon 2 according to an embodiment of the present invention. In FIG. 3, an SM optical fiber of a line diameter 125 µm, a mode field diameter 9.5 µm, and a cut-off wavelength 1.20 µm is primary-coated with ultraviolet ray hardening resin of Young's modulus 0.12 kgf/mm², and its circumference is secondary-coated with Young's modulus 90 kgf/mm² to form an optical fiber core wire 1 of a line diameter 250 µm. These twelve optical fiber core wires 1 are arranged parallel and integrally coated with the ultraviolet ray hardening resin of Young's modulus 15 kgf/mm², whereby twelve core ribbons (multicore ribbons) 2 of a thickness 0.3 mm are formed. FIG. 4 is a cross-sectional view showing a constitution of a tube unit 6. In FIG. 4, six sheets of twelve core ribbons 2 are laminated, or superimposed to form multicore ribbon units 3, which are collectively twisted in one direction and received in a tube 5 made of polybutylene terephthalate (PBT) together with a Jellylike admixture 4 of viscosity 350 dmm to form the tube unit 6. FIG. 5 is a cross-sectional view showing a constitution of an optical fiber cable 10. In FIG. 5, these tube units 6 are stranded toward a central member 7 made of synthetic resins reinforced by a glass fiber in a reverse direction at a constant pitch, and they are all pressed and wound with a tape 8 made of polyethylene terephthalate. Further, aramid fibers are further stranded around its outside to from a cable core, and an outer cover 9 of a polyethylene layer of density 0.96 g/cm$^3$ is formed outside this cable core to form the optical fiber cable 10. A space inside the outer cover 9 is filled with a petrolatum system Jelly admixture 11. In the optical fiber cable 10 as shown in FIGS. 3 to 5, in such conditions that a twisting pitch of the multicore ribbon unit 3 is 250 mm and a twisting pitch of the tube unit 6 is 250 µm, four types of optical fibers with the reverse stranding angle φ of the tube unit 6 of 215°, 275°, 335°, and 995°, respectively, are provided and this is wound around a drum of a diameter 800 mm, then a transmission test is carried out at a measurement wavelength 1.55 µm. The result thereof is shown in the following table 1.

Figure 7:
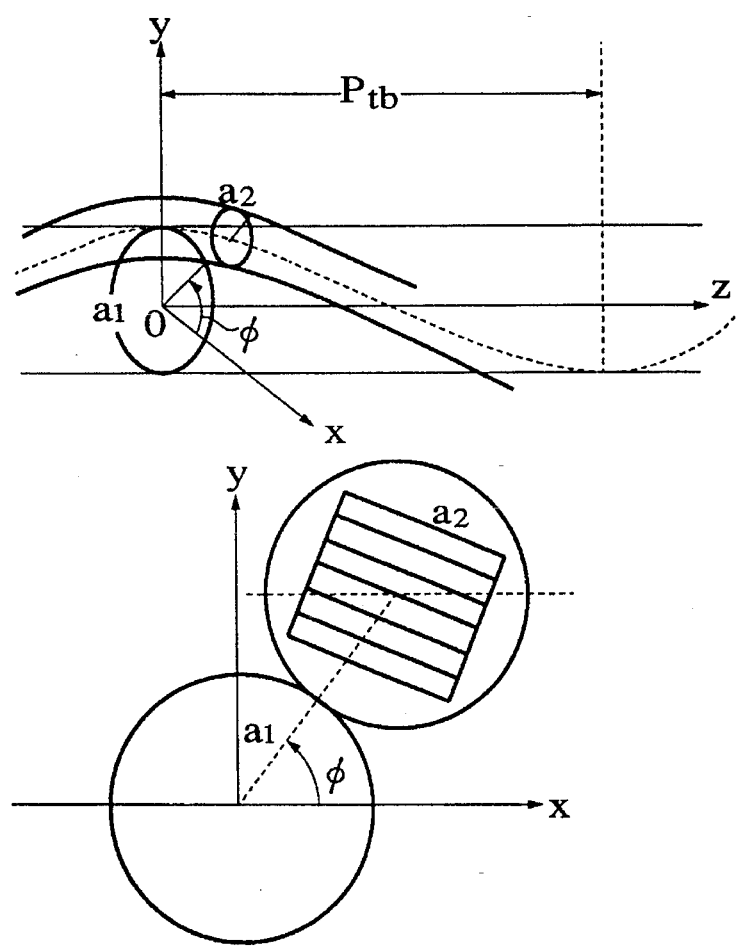
FIG. 7 is a diagram showing a coordinate system of the loose tube cable with SZ stranding.

In this connection, the stranding angle 995° is equal to 275°+2·360°. FIG. 7 shows a coordinate system of a loose tube cable with SZ stranding. A symbol φ shown in FIG. 7 is a stranding angle.

TABLE 1

| Cable No. | 1 | 2 | 3 | 4 |
|---|---|---|---|---|
| Reverse Stranding Angle of Tube Unit | 215 | 275 | 335 | 995 |
| Loss Increase (dB/km) | 0.02 | 0.02 | 0.15 | 0.3 |

As is understood apparently from the above Table 1, when the reverse stranding angle φ of the tube unit is within a scope in the vicinity of 215° to 275°, it is confirmed that a loss increase is the least and the greater the reverse stranding angle becomes exceeding 275°, the greater the loss increase becomes. Although, not shown in Table 1, the loss increase is 0.8 dB/km at reverse stranding angle of 180°. Hence we can conclude that the reverse stranding angle φ should be (215 to 335)+n·360 degrees, where n is zero or positive integer.

Figure 6:
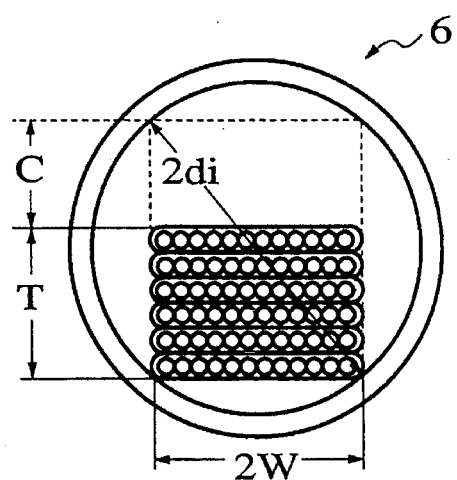
FIG. 6 is a schematic cross-sectional view showing a loose tube receiving a multicore ribbon unit, representing a clearance C of a multicore ribbon 2 and a tube 6.

In this connection, as shown in FIG. 6, the relationship among a clearance C(mm) of the multicore ribbon and tube; a width 2 W(mm) of the multicore ribbon 2; a thickness T(mm) of the multicore ribbon unit 3; and an inside diameter 2 di(mm) of the tube satisfies the relation of the equation (1). The reasons are as follows:

Assuming that a shape of bending of the multicore ribbon caused by a looseness due to a margin in a longitudinal direction of the multicore ribbon is a sine wave shape, there is provided a relationship between a minimum curvature radius ρmin of the multicore ribbon and the clearance C, represented by the equation ρmin=C/8ε where ε is a tube inside marginal length ratio of the multicore ribbon that is defined by the equation ε=(LR−LT)/LT. Here, a symbol LR is a length of the multicore ribbon within a tube length LT.

Furthermore, when it is low in a temperature, an increase in the marginal length of ΔL (=Δβ·ΔT) occurs due to a difference Δβ in the coefficient of linear expansion of the multicore ribbon and tube. Therefore, the above-mentioned minimum curvature radius ρmin is equal to ρmin=C/8(ε+L), and the lower a temperature becomes, the smaller the minimum curvature radius becomes. The relationship between the minimum curvature radius and the loss increase Δα can approximately be represented by the following experimental equation:

$$\Delta\alpha = A \cdot \rho_{min}^{-k} \qquad (2)$$

where A and k each are constants. In the optical fiber cable of the above-mentioned embodiment, when the inside diameter of a PBT tube is changed and further the ribbon is used as a reference, the loss increase at −40° C. is represented in the below Table 2. Table 2 shows the test result in the case where a transmission test is performed using a measurement wavelength 1.55 µm as well as changing the inside radius of the tube into five types of 4 mm, 4.2 mm, 4.35 mm, 4.5 mm, and 5.2 mm.

TABLE 2

| Cable No. | 11 | 12 | 13 | 14 | 15 |
|---|---|---|---|---|---|
| Inside Radius of Tube (mm) | 4.0 | 4.2 | 4.35 | 4.5 | 5.2 |
| Clearance C (mm) | 0.73 | 1.03 | 1.25 | 1.46 | 2.37 |
| Loss Increase (dB/km) | 2.50 | 0.58 | 0.08 | 0.08 | 0.07 |

The result shown in Table 2 is obtained in the case where a tube inside marginal length ratio of the multicore ribbon is ε=0.0001 and a difference Δβ of the coefficient of linear expansion of the multicore ribbon and tube is equal to $2.2\times10^{-5}/°$ C. and a constant k in the equation (2) is equal to 5.3 and A is equal to $2.05\times10^9$ (dB/km)mm$^{5.3}$. As is understood apparently from Table 2, when the clearance C of the multicore ribbon and tube (refer to FIG. 6) is higher than 1.2, the loss increase scarcely occurs.

According to this embodiment, the extension strain and the compression strain of the multicore ribbon accompanied by bending of the loose tube unit with SZ stranding are cancelled each other at intervals at one pitch of the stranding of the tube unit, whereby movements of the multicore ribbon toward the tube in the reverse stranding portion of the tube unit are removed and also the multicore ribbon is prevented from being strongly pressed against the inner surface of the tube between the reverse portion of the tube unit. As a result, it is possible to reduce an increase in the transmission loss due to these phenomena as much as possible.

Also, according to the present invention, as a strain caused by the difference in the thermal expansion accompanied by a temperature change is relaxed by setting the clearance of the multicore ribbon and tube at 1.2 mm or more, it is possible to reduce the transmission loss as much as possible even in a use environment a temperature change is intense.

Also, according to the present invention, since it is extremely simple that the multicore ribbon is twisted within the tube, the optical fiber cable according to the present invention can extremely simply and readily be manufactured.

Various modifications will become possible for those skilled in the art after receiving the teachings of the present disclosure without departing from the scope thereof.

What is claimed is:

1. An optical fiber cable comprising:

a central member;

a plurality of tube units wound around said central member in an alternating hand helix, said tube units having a plurality of superimposed ribbon units comprising a plurality of optical fibers held together in side-by-side relation, respectively, said ribbon units being loosely received in said tube units;

a sheath of plastic material encircling said tube units; and a water blocking material in any otherwise empty spaces in said tube units and between said sheath and said tube units, wherein said plurality of superimposed ribbon units in said tube units form a group of ribbon units having a common axis in cross section and said group of ribbon units is twisted around said axis in an alternating hand helix with a same twisting pitch and twisting direction of said tube units wound around said central member, said tube units reversing said twisting direction with a predetermined reverse stranding angle $\phi$, and wherein a clearance C between said superimposed ribbon units and said tube units is larger than 1.2 mm with a relation:

$$C = 2\sqrt{+e, rad\ di^2 - W^{2+ee}} - T > 1.2$$

where 2 di is a width of said ribbon unit, 2 W is a thickness of said superimposed ribbon units, and T is an inner diameter of said tube unit.

2. An optical fiber cable comprising:

a central member;

a plurality of tube units wound around said central member in an alternating hand helix, said tube units having a plurality of superimposed ribbon units comprising a plurality of optical fibers held together in side-by-side relation, respectively, said ribbon units being loosely received in said tube units;

a sheath of plastic material encircling said tube units; and a water blocking material in any otherwise empty spaces in said tube units and between said sheath and said tube units, wherein said plurality of superimposed ribbon units in said tube units from a group of ribbon units having a common axis in cross section and said group of ribbon units is twisted around said axis in an alternating hand helix with a same twisting pitch and twisting direction of said tube units would around said central member, said tube units reversing said twisting direction with a predetermined reverse stranding angle $\phi$, which is an angle measured around said axis between a first and a second reversing point of the alternating hand helix and given by, $$\phi = \Psi + 360\ n$$

where $\Psi$ is an angle between 215 and 335 degrees, and n is zero or any positive integer, and a clearance C between said superimposed ribbon units and said tube units is larger than 1.2 mm with a relation, units and said tube units is larger than 1.2 mm with a relation:

$$C = 2\sqrt{+e, rad\ di^2 - W^{2+ee}} - T > 1.2$$

where 2 di is a width of said ribbon unit, 2 W is a thickness of said superimposed ribbon units, and T is an inner diameter of said tube unit.

* * * * *

UNITED STATES PATENT AND TRADEMARK OFFICE
CERTIFICATE OF CORRECTION

PATENT NO. : 5,531,064
DATED : July 02, 1996
INVENTOR(S) : Hiroyuki SAWANO et al.

It is certified that error appears in the above-indentified patent and that said Letters Patent is hereby corrected as shown below:

Claim 1, column 7, line 16, "$C=2\sqrt{}+e, rad\ di^2-W^{2+ee}-T>1.2$"

should read --$C=2\sqrt{di^2-W^2}-T>1.2$--.

Claim 1, column 7, line 18, "2 di" should read --2di-- and

"2 W" should read --2W--.

Claim 2, column 8, line 24, "$C=2\sqrt{}+e, rad\ di^2-W^{2+ee}-T>1.2$"

should read --$C=2\sqrt{di^2-W^2}-T>1.2$--.

UNITED STATES PATENT AND TRADEMARK OFFICE
CERTIFICATE OF CORRECTION

PATENT NO. : 5,531,064
DATED : July 2, 1996
INVENTOR(S) : Hiroyuki Sawano, et. al.

It is certified that error appears in the above-indentified patent and that said Letters Patent is hereby corrected as shown below:

Claim 2, column 8, line 26, "2 di" should read --2di-- and "2 W should read --2W--.

Signed and Sealed this

Twenty-sixth Day of November 1996

Attest:

BRUCE LEHMAN

Attesting Officer                Commissioner of Patents and Trademarks